United States Patent [19]

DiGrande

[11] 4,168,101
[45] Sep. 18, 1979

[54] SPRING ASSEMBLY FOR A HIGH PRESSURE THRUST BEARING

[75] Inventor: Vincent DiGrande, Burnt Hills, N.Y.

[73] Assignee: General Electric Company, Schenectady, N.Y.

[21] Appl. No.: 898,827

[22] Filed: Apr. 21, 1978

[51] Int. Cl.² ............................................. F16C 17/06
[52] U.S. Cl. ................................................. 308/160
[58] Field of Search .................. 308/26, 160, 163–166, 308/162, 157, 142–148, 139; 267/1, 162; 248/358

[56] References Cited

U.S. PATENT DOCUMENTS

| | | | |
|---|---|---|---|
| 2,191,901 | 2/1940 | Wallgren | 308/160 |
| 2,225,835 | 12/1940 | Howarth | 308/160 |
| 2,708,110 | 5/1955 | Clay | 267/1 |
| 3,033,619 | 5/1962 | Ertl et al. | 308/160 |
| 3,113,755 | 12/1963 | Stevens et al. | 248/358 R |
| 3,375,000 | 3/1968 | Seamands et al. | 267/1 |
| 3,873,079 | 3/1975 | Kuns | 267/162 |
| 4,035,042 | 7/1977 | O'Rourke et al. | 308/160 |

Primary Examiner—Douglas C. Butler
Attorney, Agent, or Firm—Vale P. Myles

[57] ABSTRACT

A high pressure thrust bearing assembly having a rotatable runner ring mounted in sliding relationship on a plurality of flexible thrust plates, which in turn are resiliently supported on a plurality of spring subassemblies positioned between the thrust plates and an angular base member in the assembly, is characterized by having a plurality of Belleville spring discs mounted in each of the spring subassemblies. The spring discs are supported in coaxial relation on a screw, between a first and a second washer in each of the spring subassemblies, in a manner such that the spring discs are pre-compressed between the washers to bias them away from one another with a constant biasing force. Furthermore, the spring discs are arranged in cooperating pairs in the coaxial relationship so that the endmost discs have their respective concave sides abutting the closest washer thereto while the remaining pairs of discs are arranged to place the discs in alternately reversed relationship or in preselected parallel and series arrangements within given spring subassemblies thereby to selectively establish the stiffness of the spring subassemblies.

6 Claims, 2 Drawing Figures

SPRING ASSEMBLY FOR A HIGH PRESSURE THRUST BEARING

BACKGROUND OF THE INVENTION

The invention relates to high pressure thrust bearing assemblies and, more particularly, to the arrangement of a plurality of stiff spring subassemblies in such a thrust bearing to provide flexible mounting for a plurality of bearing thrust plates that are positioned to support a bearing ring for rotation.

Long before the present invention it was generally well-known that frusto-conical spring discs are useful in providing a relatively stiff, resilient force capable of supporting heavy loading with a uniform resilient stiffness. Such spring discs have come to be called Belleville spring discs since the issuance of U.S. Pat. No. 75,970 to Mr. Belleville in which he disclosed the so-called Belleville spring. Over the years a plurality of different spring assemblies have been developed to more efficiently utilize Belleville spring discs. For example, such spring discs have been stacked in concentric, parallel relation as explained in U.S. Pat. No. 3,029,071 issued to J. Wells. And Belleville spring discs have been stacked in coaxial relationship with centering rings and retainer flanges disposed around their respective inner and outer abutting peripheral surfaces to maintain concentricity of the discs and to counteract the hysteresis problems that cause some Belleville spring systems to be faulty or non-uniform in operation. One example of such retainer rings and supporting flanges used with a Belleville spring assembly is shown in U.S. Pat. No. 3,873,079 to S. Kuus.

In addition to the various prior art improvements in Belleville spring assemblies, per se, the use of Belleville springs in a wide spectrum of different applications has occurred. In general, so far as the present applicant knows, such prior applications have been limited to relatively light loading on the springs where considerable movement or vibration is induced in the spring by the load. An example of such a vibration dampening shock mount utilizing a Belleville-type spring is shown in U.S. Pat. No. 3,113,755 issued to Stevens et al. At the other end of the loading spectrum stiff Belleville spring assemblies have been used to support heavy, relatively static loads as explained in U.S. Pat. Nos. 2,191,901 and 2,708,110 which describe the use of such springs for supporting heavy loads where little movement on the spring is anticipated in normal use of the system.

Despite the general familiarity of those skilled in the high pressure thrust bearing art with Belleville spring arrangements and their advantages, it continues to be common practice to rely on conventional coil spring subassemblies to support flexibly movable thrust bearing plates in high pressure thrust bearing applications, despite the fact that the pressure has steadily increased from the early 1920's to the present time. This increasing pressure on thrust bearings has been observed, for example, in the evolution of the type waterwheel-driven electric generators that are commonly supported in rotating relationship by such bearings. In order to accommodate these increases in pressure, tighter packing of coil spring subassemblies has been resorted to in order to adequately support the thrust bearing plates in such bearing assemblies without exceeding predetermined overall dimensions for the bearing assembly. However, at the present time the existing space limitations and requirements of low friction losses for thrust bearings in larger waterwheel generator installations requires that stiffer spring subassemblies than any heretofore employed be developed for these applications. Moreover, in order to provide desired load distribution on the bottom surfaces of flexible thrust plates for such high pressure thrust bearings it is desirable to utilize stiff spring subassemblies that can have their stiffness readily modified without changing their exterior dimensions. The present invention provides the necessary spring stiffness and easy adjustment of individual spring subassembly stiffness to accommodate substantial anticipated increases in thrust bearing pressures. As explained in detail below such increased pressures are typically applied from a rotatable bearing runner ring that transmits thrust load from a generator shaft to flexible thrust plates supported by a plurality of such spring subassemblies in a thrust bearing made according to the invention.

OBJECTS OF THE INVENTION

A primary object of the present invention is to provide a spring subassembly for a high pressure thrust bearing that incorporates a plurality of such subassemblies to form a bearing having a plurality of resiliently supported thrust plates loaded to accommodate thrust bearing pressures beyond the capacity of conventional coil spring subassemblies.

Another object of the invention is to provide a means of optimizing the stiffness of individual spring subassemblies in a thrust bearing in order to compensate for the flexural stiffness of the bearing plates by means of providing a readily adjustable number and arrangement of spring discs within the respective spring subassemblies.

Yet another object of the invention is to provide a thrust bearing assembly having a plurality of stiff spring subassemblies that can be economically and reliably manufactured to provide resilient support and uniform stiffness over the range of movement desired for the flexible thrust plates of such a high pressure thrust bearing.

Additional objects and advantages of the invention will be apparent to those skilled in the art from the description of it presented herein, taken in conjunction with the accompanying drawings.

SUMMARY OF THE INVENTION

In one preferred embodiment of the invention a high pressure thrust bearing having a runner ring supported on a plurality of flexible thrust plates is provided with a plurality of Belleville spring disc subassemblies arranged, respectively, between the thrust plates and a base member to provide a uniform stiffness to the thrust plate supports over their range of vertical movement, which is determined by selectively establishing the stiffness and positioning of each spring subassembly.

DESCRIPTION OF THE PREFERRED EMBODIMENT

Figure 1:
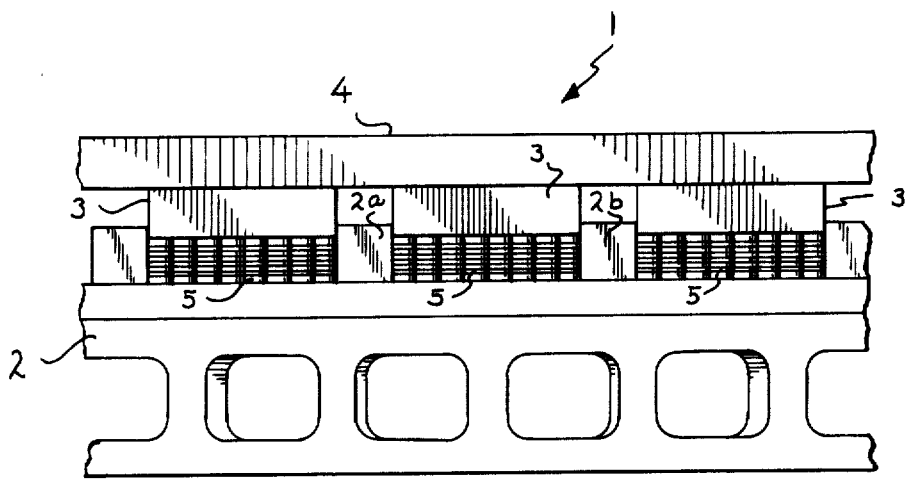
FIG. 1 is a side elevation of a portion of a high-pressure thrust bearing including a plurality of Belleville spring subassemblies constructed pursuant to the present invention and shown in their normal operating positions with respect to the other components of the overall bearing assembly.

Referring first to FIG. 1, there is shown a portion of an annular high-pressure thrust bearing 1 having a machined steel base member 2 with an annular, generally flat upper surface, a plurality of substantially identical flexible steel thrust plates, some of which are designated as the plates 3, and an annular rotatable steel runner ring 4 the bottom bearing surface of which is substantially flat to provide smooth sliding engagement with the cooperating upper surfaces of the respective thrust bearing plates 3. It will be understood that although only three thrust plates 3 are shown in the fragmentary view of the bearing 1 illustrated in FIG. 1, additional thrust plates will be disposed around the circumference of the bearing to support the rotatable runner 4 at equally spaced points around its circumference, in a manner well-known in the high-pressure thrust bearing field. A plurality of spring subassemblies 5 are positioned respectively on the upper surface of the base member 2 between it and the respective thrust plates 3, in order to provide precisely controllable resilient support for the thrust plates according to the invention.

As shown in FIG. 1, the spring assemblies 5 are clustered on the upper surface of the base member 2 between raised radial keys 2a, 2b, etc., that are bolted or otherwise suitably secured to the member 2 at spaced intervals around its circumference, as shown, to position the spring subassemblies under the thrust plates and at the same time hold the thrust plates 3 against annular movement while allowing them to move vertically on the spring subassemblies.

As described generally thus far, the high pressure thrust bearing assembly 1, shown in FIG. 1, is relatively conventional, except that each of the spring subassemblies 5 utilized in the bearing assembly is constructed with a Belleville spring disc arrangement. It will be understood that according to the invention each of the spring subassemblies 5 can be substantially identical in structure and function; accordingly, a detailed description of only one such spring subassembly 5 will now be given, with reference to FIG. 2 of the drawing, in order to provide a complete understanding of the invention. However, it will be apparent from the description of the invention that for some bearing applications a variety of arrangements of spring discs within respective subassemblies 5 may be used in a single thrust bearing in order to optimize control of thrust plate flexure, in a manner that will be described in more detail below.

Figure 2:
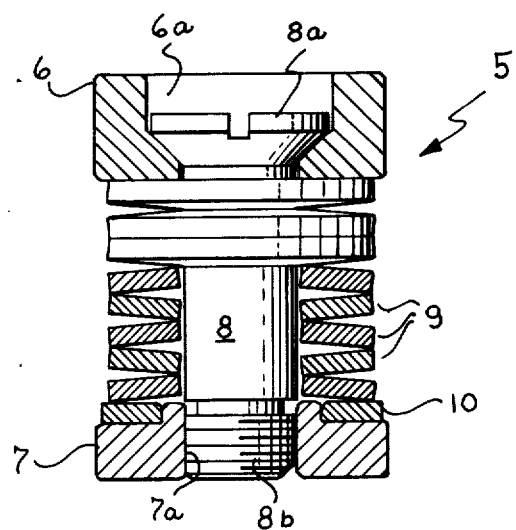
FIG. 2 is an enlarged side elevation, partly in cross-section through the center of one of the Belleville spring subassemblies illustrated in FIG. 1, showing the preferred orientation of Belleville spring discs and spring-confining washers of the illustrated preferred embodiment of the invention.

As shown in FIG. 2, the preferred embodiment of a spring assembly 5 of the invention comprises a first annular washer 6, a second annular washer 7, a threaded screw 8, and a plurality of Belleville spring discs 9 that are supported in coaxial relation on the screw 8 between the first and second washers. To provide a desired range of vertical movement for the first washer 6, a recess 6a is formed in the outermost surface thereof to slidably receive the head 8a of screw 8. The second washer 7 is provided with threads on its inner surface 7a to rotatably receive therein the threads 8a of screw 8.

In its assembled form, the spring subassembly 5 has the screw 8 slidably inserted through the aperture in the first washer 6 and threaded into the second washer 7 so that the head 8a of the screw is slidably seated on the bottom, sloped wall of a recess 6a in the head 6, as is clearly shown in FIG. 2. A predetermined pre-compression of the Belleville spring discs 9 is set for the spring subassembly 5 by rotating the screw 8. This can be done simply by loading the first washer 6 until the desired pre-compression of the discs 9 is attained, then rotating the screw 8 threading it into the second washer 7 until the screw head 8a is snugly seated on the surface 6a. After a predetermined compressive force is thus applied to all of the spring subassemblies 5 to be used in a given high pressure thrust bearing, such as the bearing assembly 1 shown in FIG. 1, the individual screws 8 are preferably welded to the respective second washers 7 to assure continuous maintenance of the selected pre-compression in all of the spring subassemblies. Obviously, other suitable means can be used to lock the screws to the second washers, if desired. When thus assembled, the spring discs 9 are each compressed between associated washers 6 and 7 to continuously apply a biasing force to the washers that tends to move them away from one another. A desirable feature of this Belleville spring arrangement is that the stiffness of the spring subassemblies 5 remains relatively uniform over the range of movement of the respective first washers 6 relative to the second washers 7.

This desired uniform stiffness of each spring subassembly 5 is assured by the arrangement of the preferred embodiment of the invention wherein the spring discs are arranged in pairs, as shown in FIG. 2, such that the two endmost discs have their respective concave side abutting the closest of the washers 6 and 7 thereto, and the convex sides of each pair of spring discs 9 is in abutting engagement. This arrangement holds the first washer 6 in a relatively flat position with respect to the base member 2 and respective thrust plates 3 of the bearing assembly 1, as shown in FIG. 1.

It should be appreciated that the relative stiffness of each spring subassembly 5 can be easily varied by rearranging the spring discs 9 therein. This feature is a major improvement over prior art thrust bearings that include thrust-plate-supporting spring subassemblies that incorporate coil springs. In addition to enabling the construction of spring subassemblies having greater stiffness than is possible with coil springs of equivalent outside diameter, the discs 9 in the subassemblies of the invention can be stacked in various groupings of parallel and/or series coaxial arrangements that differ from one spring subassembly to another in a given thrust bearing. Consequently, it is possible to more precisely control the overall flexure of the thrust plates 3 with the Belleville spring subassemblies 5 than with prior art coil spring subassemblies. To help understand the advantages of this feature of the invention, consider, for example, that in a given thrust bearing it is determined that the thrust loading on a bearing runner 4 will apply greater pressure to the center area of each plate 3, than to the surfaces near their respective edges. To optimize this flexure, for example, by maintaining the runner-supporting surfaces of the plates as nearly planar as possible (if desired) under given pressure and thermal conditions, certain of the spring subassemblies 5 can be assembled with a selected number of their respective spring discs 9 arranged in parallel, or in a combination of parallel and series arrangements, while other selected subassemblies 5 will have their spring discs 9 arranged in other parallel and/or series arrangements, such as that shown in FIG. 2. The individual spring subassembly height can be adjusted by varying the lower washer 7 thicknesses, as needed to accommodate the shortening of the stiffer, parallel disc arrangements relative to the series disc arrangements. Finally, the spring subassemblies are mounted between the plates 3 and the base member 2 so that the stiffer subassemblies are positioned under the respective center areas of the plates 3, while the other subassemblies are disposed closer to the edges of the plates. Accordingly, the plates 3 will have the stiffest springs directly under the areas of greatest pressure transmitted by the ring so that vertical deflection of the plates is lessened in these areas relative to the plate edges, thus the plates are resiliently supported in a nearly flat orientation, if desired. It should be understood that other combinations of spring disc arrangements can be readily constructed with the invention, in order to accurately control the flexure of thrust plates that are subjected to a variety of combined pressure and thermal loadings.

Another feature of the invention is that the respective diameters of each of the spring discs 9 is made no greater than the minimum outer diameters of the washers 6 and 7, while the outer diameter of each of these washers is made substantially equal. With these relative dimensions, when the spring subassemblies 5 are mounted in operating position on the upper surface of the base member 2, as shown in FIG. 1, the spring subassemblies can be positioned with the washers 6 and 7 of the respective subassemblies in contact, with adjacent upper and lower washers of the other spring subassemblies, without causing the outer edges of the spring discs 9 in the respective subassemblies to contact one another. Consequently, no additional spring subassembly spacing means is needed in the bearing assembly 1, aside from the keys 2a, 2b, etc. on the base member 2.

A modification of the basic preferred embodiment of the spring subassembly 5 described above is illustrated in FIG. 2. This modification entails the positioning of a washer 10 on the upper surface of second washer 7 to protect the top surface of washer 7 from the possibility of fretting due to contact with the possibly harder material of the lowest disc 9. Where such a problem is not anticipated, the washer 10 need not be used.

Those skilled in the bearing art will generally understand the operation of the invention from the structural arrangement of it described above, however, to assure a complete description of the invention herein it should be understood that after a suitable plurality of spring subassemblies 5 are constructed in the manner described above with reference to FIG. 2, (or in alternative, stiffer configurations for some of the subassemblies if a certain flexure pattern of plates 3 is to be controlled, as pointed out by the example described above), they are mounted in groups between the respective keys 2a, 2b, etc. on the upper surface of the base member 2 of a high pressure thrust bearing assembly such as the assembly 1 shown in FIG. 1. A plurality of thrust bearing plates 3 are then positioned on the upper washers 6 of the respective subassemblies, so that the thrust plates can move vertically between the respective keys. The abovementioned arrangement of the spring discs 9 in the respective spring subassemblies 5 serves to provide uniform preselected stiffness to predetermined areas of the bearing plates over their vertical range of movement, pursuant to the present invention. Finally, the rotatable bearing runner ring 4 is slidably mounted on the upper surface of the respective thrust plates 3 and normally the runner ring will be coupled by a suitable collar to the shaft of a generator or equivalent piece of machinery supported on such a shaft in a well-known manner.

Those skilled in the art will recognize that various alternative embodiments and modifications of the invention may be utilized without departing from the scope of the invention. Accordingly, it is my intention to encompass within the following claims the true limits of the invention.

What I claim as new and desire to secure by Letters Patent of the United States is:

1. In a thrust bearing assembly comprising a rotatable runner ring with a substantially flat bearing surface, an annular base member, a plurality of thrust plates, and a plurality of spring subassemblies positioned, respectively, on the base member between it and the respective thrust plates to provide resilient support for the thrust plates, the improvement wherein said spring subassemblies are arranged in clusters on the upper surface of said base member and each of said clusters is disposed between positioning means that are effective to position each of the clusters, respectively, under one of said thrust plates, thereby to support each thrust plate with its bearing surface formed in a predetermined curvature responsive to a load being applied to it by the runner ring, each of said spring subassemblies being arranged to continuously exert a resilient biasing force on the thrust plate positioned above it, and each of said spring subassemblies comprising:
  (a) first and second annular washers, the second washer being provided with threads to receive a screw,
  (b) a headed screw having its head slidably seated on a wall of a recess in one side of the first washer, and having its threaded portion slidably inserted through the first washer and threaded into the second washer, and
  (c) a plurality of Belleville spring discs supported in coaxial relation on said screw between the first and second washer, said spring discs being compressed between the washers thereby to continuously apply a biasing force to the washers tending to move them away from one another.

2. An invention as defined in claim 1 wherein said Belleville spring discs are arranged in pairs on said screw with convex sides of each such pair in abutting engagement and with the two endmost discs having their respective concave sides abutting the closest washers thereto.

3. An invention as defined in claim 2 wherein the respective diameters of each of said spring discs is no greater than the minimum outer diameter of said washers, and the outer diameters of said washers are substantially equal.

4. An invention as defined in claim 1 wherein the Belleville spring discs in certain of said spring subassemblies are arranged in pairs coaxially with convex sides of each such pair in abutting engagement and with the two endmost discs having their respective concave sides abutting the closest washer thereto, and other of said spring subassemblies have Belleville spring discs arranged in selected combinations of series and parallel, concentric groupings to provide greater stiffness than is provided by said certain spring subassemblies.

5. An invention as defined in claim 1 wherein a first group of said spring subassemblies positioned under each thrust plate is designed to one stiffness and is arranged in a given pattern relative to the surface of the thrust plate in engagement therewith, and a second group of said spring subassemblies is designed to a second stiffness that is greater than said first stiffness, said second group of spring subassemblies being arranged in a second given pattern relative to the surface of the thrust plate, thereby to optimize the flexure of the thrust plate under load.

6. An invention as defined in claim 1 wherein said positioning means comprise a plurality of radially disposed keys (2a, 2b) each mounted at arcuately spaced points on said base member and between respective pairs of said thrust plates.

* * * * *